April 17, 1934.  R. MÜLLER  1,955,083
AGGLUTINANT
Filed Dec. 1, 1930
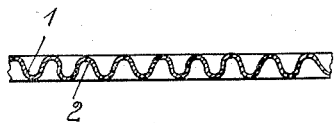
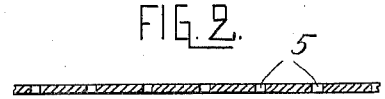
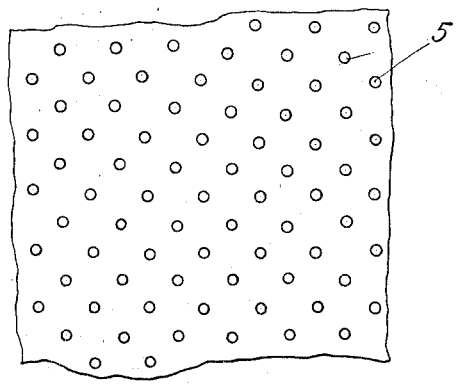
Inventor:
Richard Müller
by Karl Michaelis
Atty.

Patented Apr. 17, 1934

1,955,083

UNITED STATES PATENT OFFICE 1,955,083

AGGLUTINANT

Richard Müller, Mannheim, Germany, assignor to C. F. Boehringer & Soehne G. m. b. H., Mannheim, Germany Application December 1, 1930, Serial No. 499,333
In Germany December 3, 1929

6 Claims. (Cl. 18—48)

My invention refers to agglutinants or adhesives and more especially to a solid agglutinant adapted to be used without being dissolved. Agglutinants of this character have for instance been disclosed in the applications for patent of the United States filed by Willy Stelkens on June 29, 1929, Serial No. 374,935 and by Willy Stelkens and myself jointly on August 9, 1930, Serial No. 474,301. It is an object of my invention to improve these and other solid agglutinants with a view to increasing their efficiency and more especially expediting their action.

In view of the drawbacks adhering to the use of fluid agglutinants, which when kept in open containers are known to be subject to decomposition and hardening and require greater quantities of solvents to be evaporated when applied to the surfaces to be united, it has been suggested to unite all kinds of materials including leather, textile materials, glass, wood, metal, etc., by means of solid agglutinants, for instance in the form of films or folia, the fixing of these folia on the material and the cementing together of different materials by means of such folia can be effected by rendering the folia plastic and adhesive by moistening them with a solvent or swelling agent or with a solution containing such solvent or swelling agent or by dipping the folia into such solvents or solutions. If treated in this manner the folia after evaporation of the solvents will be intimately united with materials of any desired character. The period of time required for the fixation will vary in proportion to the swelling capacity of the material constituting the folia and the properties of the solvents employed.

I have now found that the swelling and fixing capacity of folia of all kinds can be greatly increased if the solvents or swelling agents are offered a free entrance into the interior of the folia, i. e. into the body of a folium enclosed between its two surfaces. By providing the folia with indentations, for instance by pressing, better still by forming the folia with perforations which impart to them a sieve-like character, or by forming the folia with irregularly distributed pores, the solvent or swelling agent will enter the body of such a folium not only from the plane surfaces, but also from the side walls of the indentations or perforations, which greatly increase its superficial area so that the total surface open to the attack of the solvent or swelling agent is far greater than with ordinary solid folia.

These methods produce fluid passages leading into the interior of the sheeted adhesive and increase its effective surface area. Folia treated in this manner will soften and become plastic upon brief contact with a liquid solvent such as by spraying, dipping and the like.

Apart from a considerable acceleration of the plastification of the folia a perforation still offers further advantages. Thus for instance when fixing ordinary smooth folia on the plane surface of a material to be cemented to some other material, air will be included between the material and the folia and folds will often be formed in the softened folia, thus diminishing the fixation effect. In contradistinction thereto a perforated folium will apply itself at once to the material to be glued very uniformly all over its surface, because the air can escape through the perforations, slots or the like formed in such a folium.

If the perforations are suitably formed and distributed on the folia, a dipping into the solvent or swelling agent or a moistening, for instance by spraying, of both sides of the folia will be unnecessary. Obviously in the case where the material constituting the folia is swelling rapidly, this fact will greatly facilitate its handling and allows avoiding the use of an excess of solvent, which might spoil sensitive materials to be cemented together by means of the folia. For if perforated or porous and, if desired, suitably profilated folia or folia offering in some other way a free passage to the liquid are placed on a sheet of the material to be cemented to some other material and if the top surface of the folium is coated with a solvent, this latter will enter the perforations and under the action of the capillary effects arising between the bottom surface of the folium and the material will be distributed also on the bottom surface of the folium, thereby causing same to swell and become plastic.

By using perforated or profilated folia I can also employ folia consisting of a material which if formed with a plane surface would swell too slowly and in view of its slow plasticity would be unfit for use for certain purposes. Therefore the new configuration of the surfaces and body of the folia renders it possible to greatly increase the number of agglutinants adapted for use in many cases.

Instead of providing the folia with indentations or perforations I can also form fluid passages or paths for the solvent or swelling agent into the body of the folia by admixing to the material constituting the folia a soluble filler which can be subsequently extracted therefrom. I may for instance form folia from a mixture of 100 parts by weight of a suitable nitrocellulose and 60 parts commercial zinc white. If these folia are subsequently treated with dilute acetic acid, the zinc white will be removed from the body of the folia by dissolution and the folia now have the form of a readily permeable porous structure.

I may also insert in the folium a liquid absorbing substance, such as for instance fibrous matter acting after the manner of a wick, which will be instrumental in forming fluid passage for conveying the liquid into the body of the folium.

For instance in order to render a folium readily permeable which consists of cellulose acetate and a suitable softening medium, for instance triphenyl phosphate, or of a combination of plastified cellulose acetate and plastified nitrocellulose, the folium having a thickness of about 0.13 mms., I may provide the folium with a narrow network of holes, slots or other perforations by piercing it with needles, cutting blades or punches of any desired configuration. If a folium of this kind is dipped into a suitable solvent or swelling agent, such as acetone, and is then placed in position between two pieces of leather to be united, which are pressed together, they will be firmly cemented to each other.

A folium formed from a mixture of three parts nitrocellulose and one part camphor after having been perforated as above described may for instance be placed on a piece of leather or a web of linen and caused to swell and soften by coating it, for instance by squirting or sprinkling, with a solvent. Another piece of leather or web of linen placed thereon will then, with or without the application of slight pressure, be united with the first web.

This invention is further useful in the case where a piece of leather or other material shall be prepared so that it can at any time thereafter be cemented to another piece of leather or the like. In this case the coating of the leather surface with the usual fluid agglutinant would be connected with difficulties inasmuch as the leather surface is comparatively uneven, so that the fluid agglutinant will flow off the higher point and will collect in the depressions formed in the leather. When using the usual solid folia instead of fluid adhesives, even if the folia have thoroughly been moistened, the greater quantity of the moistening liquid (solvent) is rapidly absorbed by the leather. In order to make such folia stick to the leather, pressure would have to be applied, and in this case the folia would also stick to the press. If a perforated folium such as above described is used, it may simply be placed on the leather surface and then be moistened with the solvent or swelling agent, for instance by depositing same on the free surface of the folium by sprinkling or atomizing. The solvent or swelling agent passing through the perforations will then rapidly be distributed on both sides of the folium and will cause the folium to soften and be disintegrated and to stick to the leather without any pressure being applied. Of course the material, provided that it is not highly absorbent, may also first be moistened with the solvent or swelling agent and the dry folium placed on the moist surface.

In the drawing affixed to this specification and forming part thereof several embodiments of my invention are illustrated diagrammatically by way of example, all of them being drawn to a greatly enlarged scale.

In the drawing

Fig. 1 is a cross section of a profilated film,

Figs. 2 and 3 are a cross section and plan view respectively of a mechanically perforated folium, Fig. 4 is a cross section of a folium having irregular cavities and channels formed therein and Fig. 5 is a similar view of a folium having fibrous material embedded therein.

Referring first to Fig. 1, the folium is formed with depressions 1 and 2, whereby the active surface of the folium is greatly increased so that the solvent or swelling agent can act more rapidly thereon.

The film shown in Figs. 2 and 3 is formed with regularly distributed perforations 5.

The film shown in Fig. 4 is formed with irregularly distributed cavities 7 and channels 8 formed by extracting, by dissolution, a soluble substance originally admixed to the agglutinant forming the body of the film.

In Fig. 5 the film of agglutinant is shown with absorbent fibres, for instance wool or cotton fibres 10 embedded therein with their ends exposed on the plane surfaces of the film.

Various changes may be made in the details disclosed in the foregoing specification without departing from the invention or sacrificing the advantages thereof.

I claim:—

1. An agglutinant being the combination of a folium of a cellulose compound, capable of dissolving or swelling in contact with a dissolving or swelling agent, with absorbent fibres embedded in said folium, providing fluid passages in said folium serving to increase its effective surface area.

2. An agglutinant being the combination of a folium of a cellulose compound, capable of dissolving or swelling in contact with a dissolving or swelling agent, with such agent and absorbent fibres embedded in said folium providing fluid passages in said folium serving to increase its effective surface area.

3. A solid cellulosic agglutinant in sheet form capable of softening upon application of a liquid solvent and being permeated with fluid passages through which said liquid solvent, upon application to one face of said sheet, will pass through said sheet to wet the opposite face also; said sheet being sufficiently thin to soften and become plastic at ordinary temperatures upon application of a liquid solvent to one face of said sheet.

4. A solid cellulosic agglutinant in sheet form capable of softening upon application of a liquid solvent and being provided with fluid passages increasing its effective surface area; said sheet being sufficiently thin to soften and to become plastic upon brief contact with said liquid solvent at ordinary temperatures such as by spraying, dipping and the like.

5. The agglutinant of claim 3 wherein the said sheet of agglutinant is perforated to provide fluid passages.

6. The agglutinant of claim 4 wherein the said sheet is provided with fluid passages formed by extraction of a soluble filler from said sheet.

RICHARD MÜLLER.